US011333783B2

(12) United States Patent
Chen et al.

(10) Patent No.: US 11,333,783 B2
(45) Date of Patent: May 17, 2022

(54) INTEGRATED METHOD FOR ESTIMATION OF SEISMIC WAVELETS AND SYNTHESIS OF SEISMIC RECORDS IN DEPTH DOMAIN

(71) Applicant: Chengdu University of Technology, Sichuan (CN)

(72) Inventors: Xuehua Chen, Sichuan (CN); Shuaishuai Jiang, Sichuan (CN); Jie Zhang, Sichuan (CN); Wei Jiang, Sichuan (CN); Bingnan Lv, Sichuan (CN)

(73) Assignee: Chengdu University of Technology, Chengdu (CN)

( * ) Notice: Subject to any disclaimer, the term of this patent is extended or adjusted under 35 U.S.C. 154(b) by 695 days.

(21) Appl. No.: 16/264,662

(22) Filed: Jan. 31, 2019

(65) Prior Publication Data

US 2019/0277993 A1    Sep. 12, 2019

(30) Foreign Application Priority Data

Mar. 7, 2018 (CN) .......................... 201810185055.2

(51) Int. Cl.
*G01V 1/50* (2006.01)
(52) U.S. Cl.
CPC ........ *G01V 1/50* (2013.01); *G01V 2210/6226* (2013.01); *G01V 2210/67* (2013.01)

(58) Field of Classification Search
CPC .. G01V 1/282; G01V 1/50; G01V 2210/6226; G01V 2210/67
See application file for complete search history.

(56) References Cited

U.S. PATENT DOCUMENTS

2016/0131781 A1* 5/2016 Sun ........................ G01V 1/282
367/7

FOREIGN PATENT DOCUMENTS

| CN | 103592680 A | * | 2/2014 | |
| CN | 107229075 A | * | 10/2017 | |
| WO | WO-9607935 A1 | * | 3/1996 | ............. G01V 1/306 |

* cited by examiner

*Primary Examiner* — Regis J Betsch

(57) ABSTRACT

A method for estimating the depth-domain seismic wavelets from depth-domain seismic data and synthesizing depth-domain seismic records. The method includes: obtaining depth coordinates and P-wave velocity v and density from well log, calculating a corresponding reflectivity series r; performing constant-velocity depth conversion for a seismic trace S and a reflectivity series r by using a velocity $v_c$ as a reference velocity to obtain the converted seismic trace $S_1$ and the converted reflectivity series $r_1$; and estimating a depth-domain seismic wavelet w based on the Gibbs sampling method; synthesizing depth-domain seismic record by using the P-wave v, the reflectivity series r and the estimated depth-domain seismic wavelet w.

3 Claims, 6 Drawing Sheets

INTEGRATED METHOD FOR ESTIMATION OF SEISMIC WAVELETS AND SYNTHESIS OF SEISMIC RECORDS IN DEPTH DOMAIN

CROSS-REFERENCE TO RELATED APPLICATIONS

This application claims the benefit of priority from Chinese Patent Application No. CN 201810185055.2, filed on Mar. 7, 2018. The content of the aforementioned application, including any intervening amendments thereto, is incorporated herein by reference in its entirety.

TECHNICAL FIELD

The present disclosure relates to petroleum seismic exploration, and more particularly to a method for estimating the depth-domain seismic wavelets from depth-domain seismic data and synthesizing depth-domain seismic records by using depth-domain forward modeling techniques.

BACKGROUND

Compared with the prestack time migration, prestack depth migration is a more successful and effective seismic data processing method. The prestack depth migration technique can accurately determine the subsurface geological structure, and has a prominent performance in noise suppression for low signal-to-noise ratio (SNR) data. This effective processing technology can better avoid exploration and exploitation risks. At the same time, the obtained velocity fields can also provide a basis for subsequent inversion and interpretation. Therefore, a horizon calibration for seismic data in depth domain is particularly important.

The horizon calibration of seismic data in depth domain requires depth-domain synthetic seismic records. Logging data is required for synthesizing depth-domain seismic records. The conventional approach mainly includes following steps. First, converting the borehole-side seismic trace from depth domain to constant-velocity depth domain; estimating seismic wavelets in constant-velocity depth domain under the condition of linear time-invariant. Then, convoluting the wavelet with reflectivity series to construct the constant-velocity depth-domain synthetic seismogram. Finally, inversely converting the constant-velocity depth-domain synthetic seismogram back to the true depth domain to obtain the depth-domain synthetic seismogram. This approach has certain advantages, but it has the problem of reflectivity leakage when converting reflectivity series from depth domain to constant-velocity depth domain. This problem can be solved by increasing the sampling rate, but the consequent calculation time required increases dramatically. Therefore, it is of great significance to develop seismic data processing and interpretation techniques in depth domain such as depth-domain forward numerical modeling.

SUMMARY

The present disclosure provides a method for estimating depth-domain seismic wavelets directly from depth-domain seismic data, and synthesizing depth-domain seismic records by using depth-domain forward numerical modeling techniques and the estimated wavelets. The method can not only take into account the spatial variation characteristics of seismic wavelets, but also obtain the depth-domain seismic records containing effective information in the entire stratum range.

To achieve the above object, the present disclosure includes following main steps: (1) obtaining depth coordinates and P-wave velocity v and density from well log in a study area, and calculating the corresponding reflectivity series r; (2) in order to satisfy the linear time-invariant condition, performing the constant-velocity depth conversion for a borehole-side seismic trace S and a reflectivity series r by using a velocity $v_c$ as the reference velocity to obtain the converted seismic trace $S_1$ and the converted reflectivity series $r_1$; and estimating the depth-domain seismic wavelet w based on the Gibbs sampling method; (3) synthesizing the depth-domain seismic record by using P-wave velocity v and the reflectivity series r obtained in step (1) and the depth-domain seismic wavelet w estimated in step (2).

The constant-velocity depth conversion in above step (2) is performed according to following formula:

$$\Delta d_c = \Delta d \times \frac{v_c}{v_{max}};$$

where, $\Delta d$ is a depth sampling interval of well log, $v_c$ is a user-defined velocity, $v_{max}$ is a maximum velocity recorded in well log, and $\Delta d_c$ is a depth sampling interval after the constant-velocity depth conversion; the seismic trace S and the reflectivity series $r_1$ are resampled at the converted sampling interval $\Delta d_c$ to obtain the converted seismic trace $S_1$ and the converted reflectivity series $r_1$.

A convolution model for estimating the seismic wavelet according to Gibbs sampling method is as follows:

$$S_1 = r_1 * w + e;$$

where, $S_1$ and $r_1$ are the seismic trace and reflectivity series in the constant-velocity depth domain, respectively. "*" represents the convolution operation; w is the seismic wavelet in constant-velocity depth domain; e is the error term.

The error term e in the above equation meets the multivariate normal distribution with a mean vector of 0 and a covariance matrix of $\Sigma_s$; the seismic trace $S_1$ in the constant-velocity depth domain satisfies a following normal distribution:

$$S_1 | \mu_s, \Sigma_s \sim N_m(\mu_s, \Sigma_s);$$

where, N represents the normal distribution, m is the number of sampling points of $S_1$, $\mu_s = r_1 * w$, $\Sigma_s = \sigma_s^2 M_s$; where $M_s$ is a correlation coefficient matrix constructed by $S_1$, $\sigma_s^2$ satisfies the inverse-gamma distribution:

$$\sigma_s^2 : IGa(\alpha_s, \lambda_s);$$

where, $\alpha_s$ is a shape parameter, $\lambda_s$ is a scale parameter.

The seismic wavelet w to be estimated in constant-velocity depth domain satisfies following normal distribution:

$$w | \mu_w, \Sigma_w \sim N_o(\mu_w, \Sigma_w);$$

where, N represents the normal distribution and o is the number of sampling points of w, $\mu_w$ meets a multivariate normal distribution with a mean vector of 0 and a covariance matrix of $\Sigma_{wa} = 10000 M_w$, $\Sigma_w = \sigma_w^2 M_w$; where $M_w$ is a correlation coefficient matrix constructed from a known wavelet; $\sigma_w^2$ also satisfies the inverse-gamma distribution:

$$\sigma_w^2 : IGa(\alpha_w, \lambda_w);$$

where $\alpha_w$ is a shape parameter, $\lambda_w$ is a scale parameter.

Therefore, unknown parameters involved in the depth-domain seismic wavelet estimation model are: $w$, $\mu_w$, $\sigma_w^2$ and $\sigma_s^2$. According to the Bayesian theorem, a posterior distribution of the unknown parameters is expressed as:

$$p(w,\mu_w,\sigma_w^2,\sigma_s^2|s,r) \propto p(s|r,w,\sigma_s^2)p(w|\mu_w,\sigma_w^2)p(\mu_w)p(\sigma_w^2)p(\sigma_s^2).$$

The steps to estimate the depth-domain seismic wavelet based on the Gibbs sampling method are as follows:

1) giving the initial values of $w^{(0)}$, $\mu_w^{(0)}$, $\sigma_w^{2(0)}$, $\sigma_s^{2(0)}$ to $w$, $\mu_w$, $\sigma_w^2$, $\sigma_s^2$ respectively;

2) repeating the following steps at a given number of cycles t=1, 2, ... :

a) generating a candidate value $w^{(t)}$ from following full conditional distribution:

$$f(w|\mu_w^{(t-1)},\sigma_w^{2(t-1)},\sigma_s^{2(t-1)},s,r):N_o(\mu_{wf},\Sigma_{wf});$$

b) generating a candidate value $\mu_w^{(t)}$ from following full conditional distribution:

$$f(\mu_w|w^{(t)},\sigma_w^{2(t-1)},\sigma_s^{2(t-1)},s,r):N_o(\mu_{\mu_w f},\Sigma_{\mu_w f});$$

c) generating candidate value $\sigma_w^{2(t)}$ from following full conditional distribution:

$$f(\sigma_w^2|w^{(t)},\mu_w^{(t)},\sigma_s^{2(t-1)},s,r):IGa(\alpha_{wf},\lambda_{wf});$$

d) generating a candidate value $\sigma_s^{2(t)}$ from following full conditional distribution:

$$f(\sigma_s^2|w^{(t)},\mu_w^{(t)},\sigma_w^{2(t)},s,r):IGa(\alpha_{sf},\lambda_{sf});$$

Obtaining the estimated depth-domain seismic wavelet if the candidate value $w^{(t)}$ meets the convergence condition.

The specific steps of synthesizing seismic depth-domain record in the above step (3) are as follows:

1) using the calculated reflectivity series r as the initial input data $p(z;0)=[r(0),L,r(n),L,r(D)]^T$;

performing a Fourier transform to the depth-domain wavelet w to obtain the wave number domain wavelet W;

2) calculating $e^{-ik_z\Delta d}$;

where, $$k_z = \frac{4\pi \times (j-1)}{0.002 \times v(n) \times t},$$

j is the $j_{th}$ frequency sampling point, v(n) is a velocity at the $n_{th}$ depth sampling point, t is the number of frequency sampling points, $\Delta d$ is a depth sampling interval;

multiplying $e^{-ik_z\Delta d}$ with p(n−1;j) to obtain p(n;j):

$$p(n;j)=e^{-ik_z\Delta d} \times p((n-1);j);$$

4) returning to step 2) and continuing the depth cycle until a maximum depth is reached; so that the temporary variable p(j) at current frequency j is obtained as follow:

$$p(j)=p(D;j)\times W(j);$$

where D is the number of the depth sampling points;

4) taking another frequency of j+1, repeating steps 2) and 3) until all frequencies have been repeated, so that the following temporary array is obtained:

$$p'=[p(1),\ldots p(j),\ldots p(t)];$$

5) initializing the values of frequency and depth; taking a frequency of j, when the depth is n, calculating $e^{ik_z\Delta d}$ and multiplying $e^{ik_z\Delta d}$ with p(j), so that a temporary variable P(n;j) is obtained:

$$P(n;j)=e^{ik_z\Delta d} \times p(j);$$

7) taking another frequency j+1, returning to step 5) and continuing the frequency cycle until the maximum frequency is reached; so that the value of synthetic seismogram at depth n is obtained as follow:

$$P(n) = \sum_{j=1}^{j=t} P(n; j);$$

8) taking another depth n+1, repeating steps 5) and 6) until a maximum depth is reached; a final synthetic seismogram P is obtained:

$$P=[P(1),\ldots,P(n),\ldots,P(D)].$$

Figure 1:
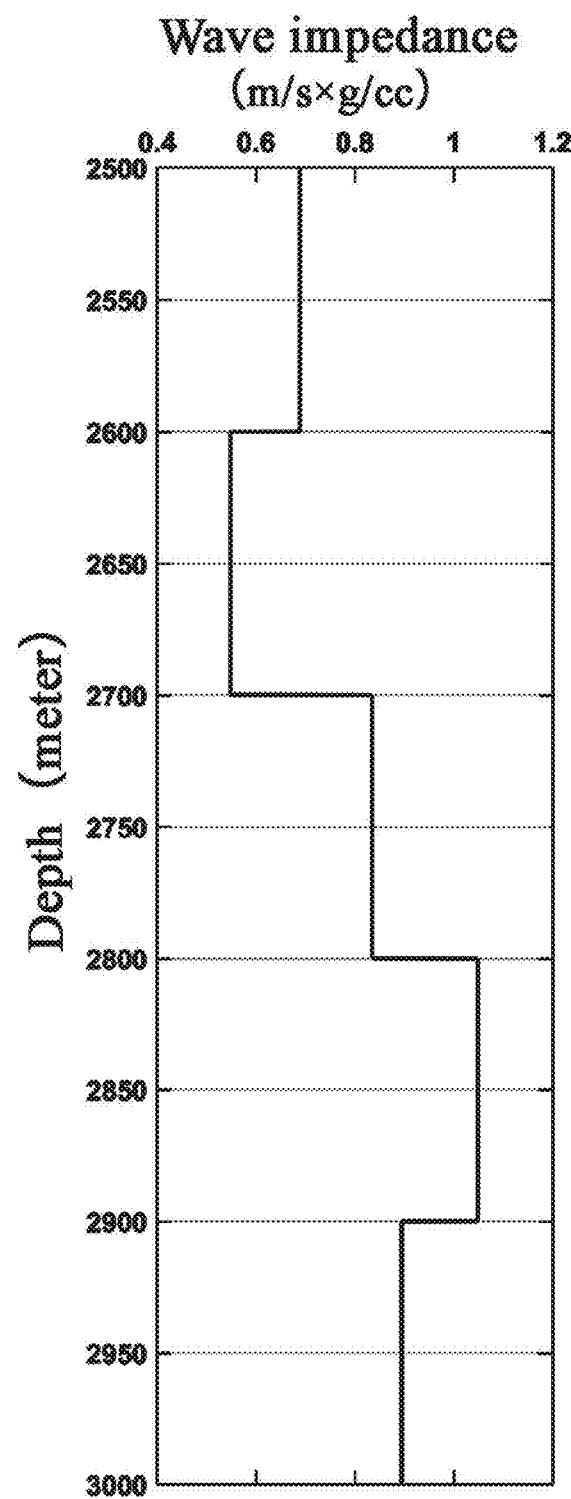
FIG. 1 is a diagram of one-dimensional multi-layer impedance model; wherein the abscissa represents the impedance in units of m/s×g/cc, and the ordinate represents depth in units of meters; the depth sampling interval is 1 meter.
Figure 2:
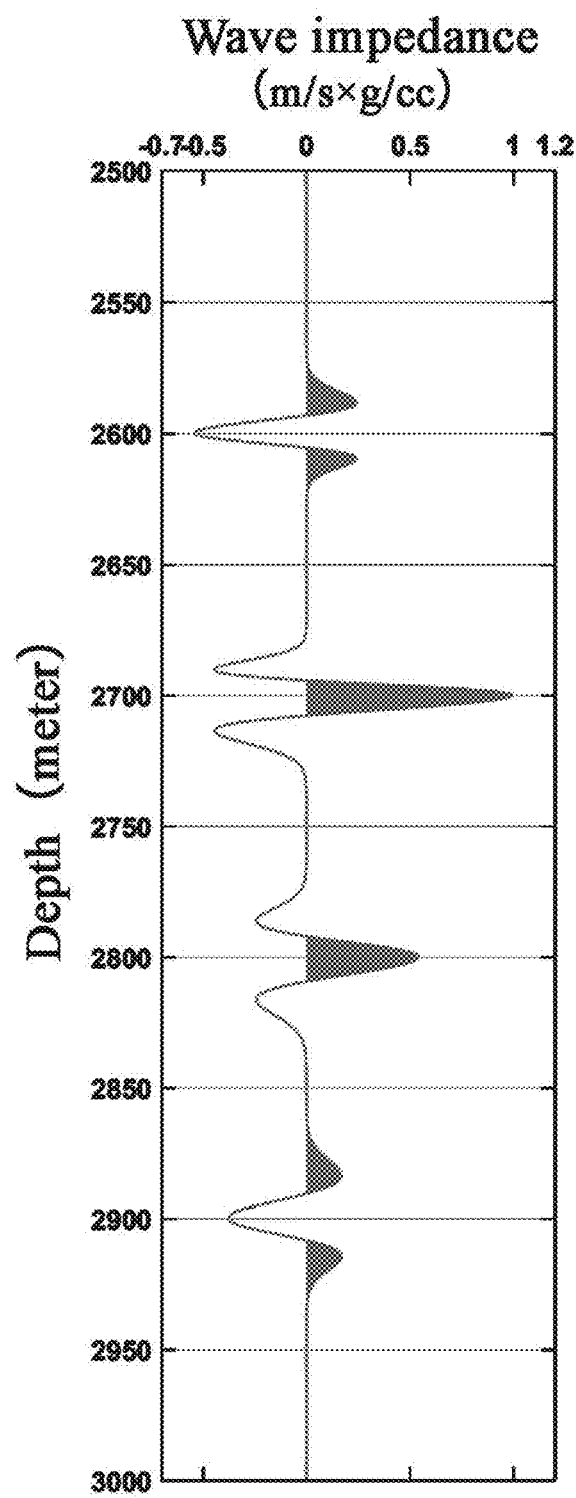
FIG. 2 is a diagram of depth-domain seismic records synthesized by using the conventional approach; wherein the ordinate represents depth in units of meters; and the abscissa represents the impedance in units of m/s×g/cc.
Figure 3:
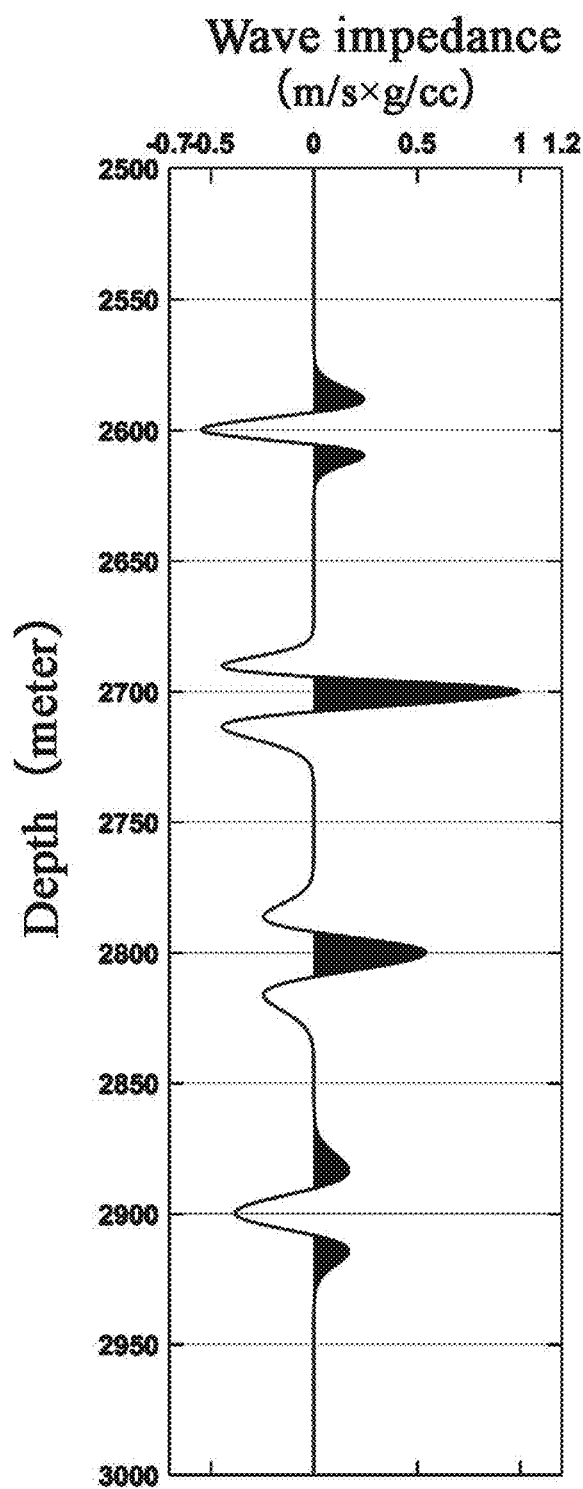
FIG. 3 is a diagram of depth-domain synthetic seismic records synthesized by the method of the present disclosure; wherein the ordinate represents depth in units of meters; and the abscissa represents the impedance in units of m/s×g/cc.
Figure 4:
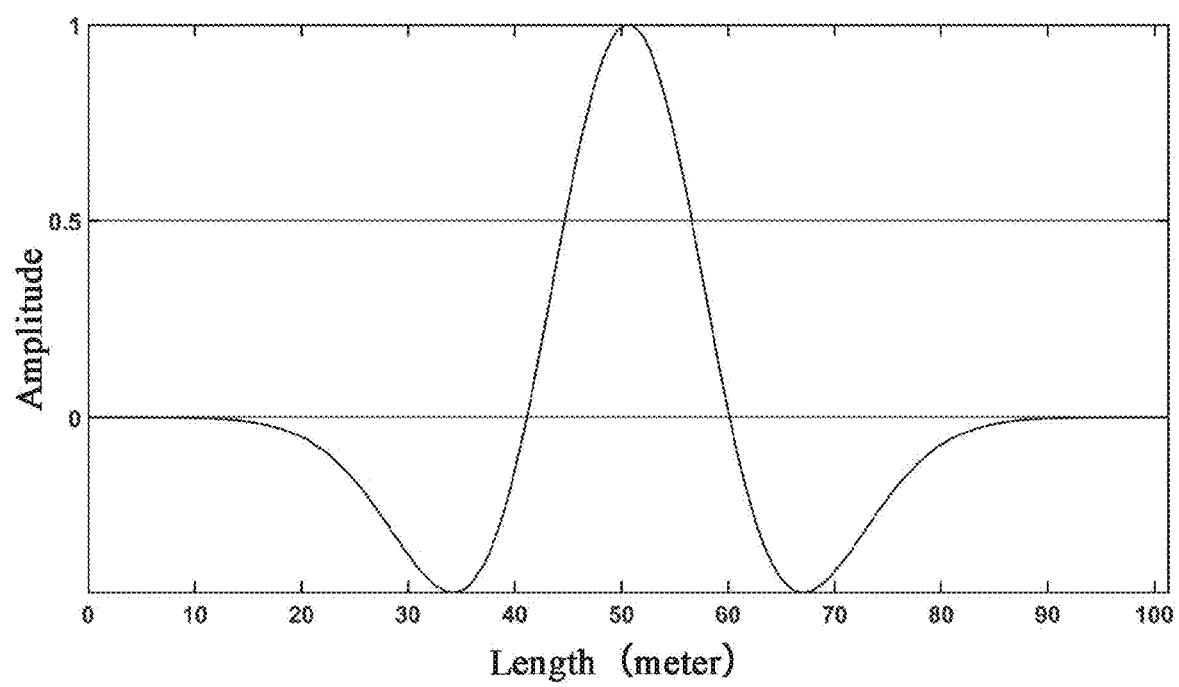
FIG. 4 is a diagram of Ricker wavelet in the constant-velocity depth domain, which is used for making depth-domain synthetic seismograms in FIG. 1, with the velocity of 3000 m/s and a dominant frequency of 50 Hz under theoretical conditions.
Figure 5:
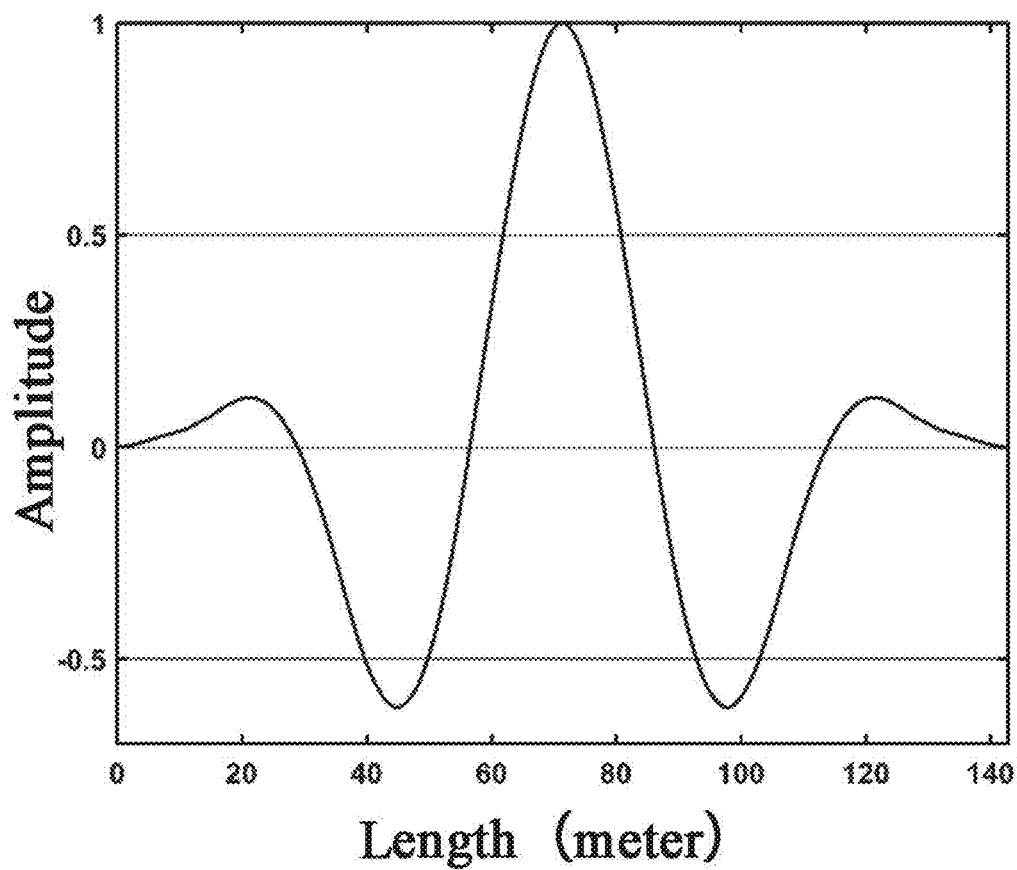
FIG. 5 is a diagram of depth-domain seismic wavelet estimated from a borehole-side seismic trace; wherein the abscissa represents the length in the unit of meters, and the ordinate represents the amplitude.
Figure 6:
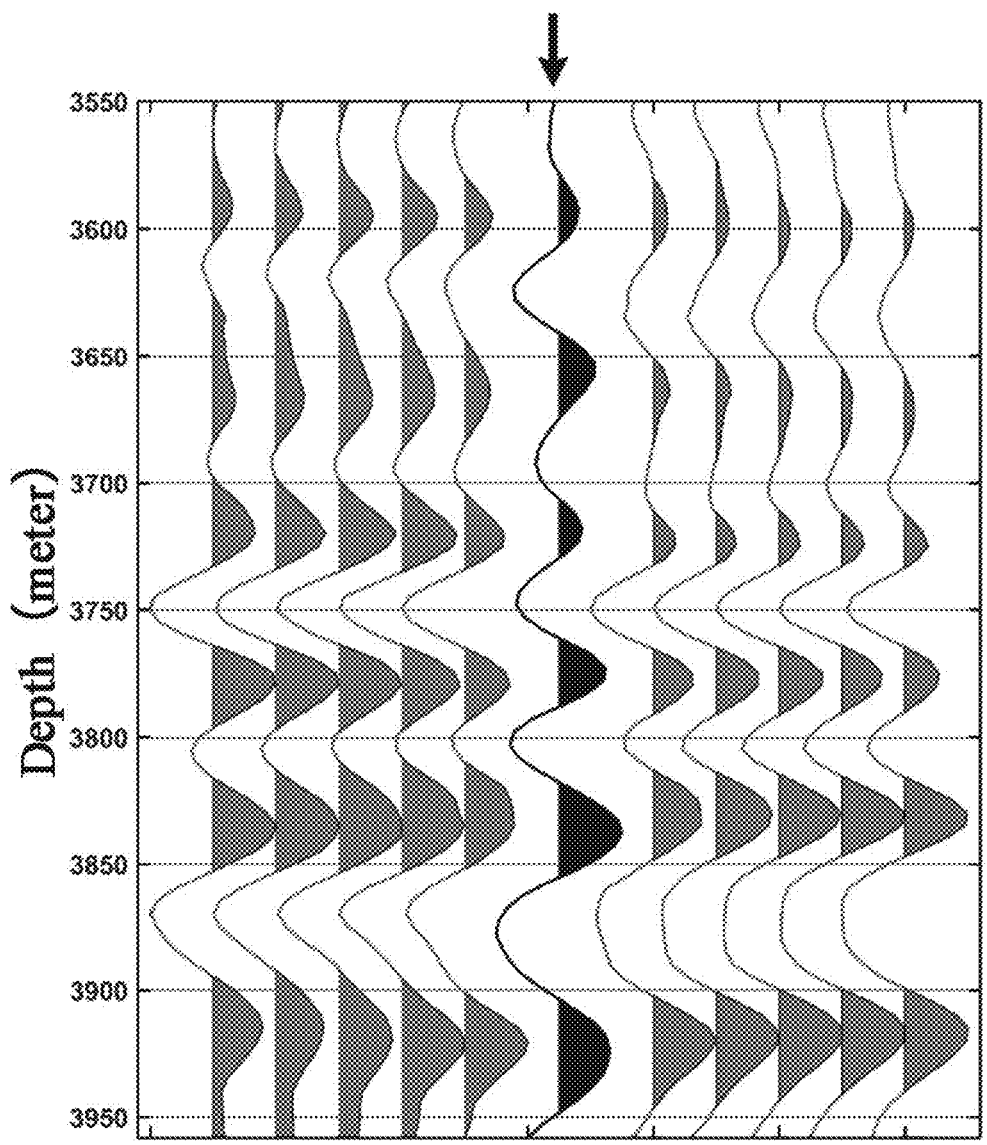
FIG. 6 is a diagram of comparison of the depth-domain synthetic seismic records with the borehole-side seismic traces; wherein the ordinate represents the depth in the unit of meters, and the range of the depth is from 3550 meters to 3975 meters.

DETAILED DESCRIPTION OF EMBODIMENTS (2) Calculating a reflectivity series form the well log as follow:

$$r_i = \frac{\rho_{i+1}v_{i+1} - \rho_i v_i}{\rho_{i+1}v_{i+1} + \rho_i v_i};$$

where, $r_i$ is a depth-domain reflection coefficient between the $i_{th}$ sampling point and the $(i+1)_{th}$ sampling point, $\rho_i$ is a density of the $i_{th}$ sampling point and $v_i$ is a velocity of the $i_{th}$ sampling point.

(2) Selecting an appropriate borehole-side seismic trace from prestack depth migration seismic data and defining the velocity $v_c$ as a standard velocity, performing constant-velocity depth conversion according to the following formula to satisfy the linear time-invariant condition:

$$\Delta d_c = \Delta d \times \frac{v_c}{v_{max}};$$

where $\Delta d$ is a depth sampling interval of well log, $v_{max}$ is the maximum velocity recorded in well log, and $\Delta d_c$ is a depth sampling interval after the constant-velocity depth conversion. The borehole-side seismic trace S and reflectivity series r are resampled at the converted sampling interval $\Delta d_c$ to obtain the converted seismic trace $S_1$ and reflectivity series $r_1$.

Before performing constant-velocity depth conversion, the true depth h is:

$$h = \sum_{i=1}^{i=l} \Delta d;$$

where, l is the number of depth sampling points of well log.

The depth h after constant-velocity depth conversion is $h_c$:

$$h_c = \sum_{i=1}^{i=l} \Delta d_c;$$

(3) A convolution model in constant-velocity depth domain is as follows:

$$S_1 = r_1 * w + e;$$

where, $S_1$ and $r_1$ are the seismic trace and reflectivity series in the constant-velocity depth domain, respectively; "*" represents the convolution operation; w is the seismic wavelet to be estimated in constant-velocity depth domain; e is an error term.

For the error term e in the above equation, we assume that it meets a multivariate normal distribution with a mean vector of 0 and a covariance matrix of $\Sigma_s$. For seismic trace $S_1$ in the constant-velocity depth domain, we assume that it satisfies following normal distribution:

$$S_1|\mu_s,\Sigma_s \sim N_m(\mu_s,\Sigma_s);$$

where, N represents the normal distribution, m is the number of sampling points of $S_1$, $\mu_s = r_1 * w$, $\Sigma_s = \sigma_s^2 M_s$, where $M_s$ is a correlation coefficient matrix constructed by $S_1$ and is a positive definite matrix; $\sigma_s^2$ is a variance factor which satisfies an inverse-gamma distribution:

$$\sigma_s^2 \sim IGa(\alpha_s,\lambda_s)$$

in the formula, $\alpha_s$ is the shape parameter, $\lambda_s$ is a scale parameter.

For the seismic wavelet w estimated in the constant-velocity depth domain, we assume that it satisfies following normal distribution:

$$w|\mu_w,\Sigma_w \sim N_o(\mu_w,\Sigma_w)$$

where, N represents the normal distribution and o is the number of sampling points of w, $\mu_w$ meets a multivariate normal distribution with a mean vector of 0 and a covariance matrix of $\Sigma_{wa} = 10000 M_w$. $\Sigma_w = \sigma_w^2 M_w$, where $M_w$ is a correlation coefficient matrix constructed from a known wavelet (e.g. the Ricker wavelet), $\sigma_w^2$ also satisfies an inverse gamma distribution:

$$\sigma_w^2 \sim IGa(\alpha_w,\lambda_w);$$

where, $\alpha_w$ is a shape parameter, $\lambda_w$ is a scale parameter.

Unknown parameters involved in the depth-domain seismic wavelet estimation model of the method of the present disclosure are: w, $\mu_w$, $\sigma_w^2$ and $\sigma_s^2$. According to the Bayesian theorem, a posterior distribution of the unknown parameters is expressed as:

$$p(w,\mu_w,\sigma_w^2,\sigma_s^2|s,r) \propto p(s|r,w,\sigma_s^2)p(w|\mu_w,\sigma_w^2)p(\mu_w)p(\sigma_w^2)p(\sigma_s^2);$$

The steps to estimate the depth-domain seismic wavelet based on the Gibbs sampling method are as follows:

1) giving the initial values of $w^{(0)}$, $\mu_w^{(0)}$, $\sigma_w^{2(0)}$, $\sigma_s^{2(0)}$ to w, $\mu_w$, $\sigma_w^2$, $\sigma_s^2$ respectively;

2) repeating the following steps at a given number of cycles t=1, 2, ... :

a) generating a candidate value $w^{(t)}$ from following full conditional distribution:

$$f(w|\mu_w^{(t-1)},\sigma_w^{2(t-1)},\sigma_s^{2(t-1)},s,r):N_o(\mu_{wf},\Sigma_{wf});$$

where, $\mu_{wf} = \mu_w + \Sigma_w R^T(R\Sigma_w R^T + \Sigma_s)^{-1}(S_1 - R\mu_w)$, T stands for the transpose, R is a Toeplitz matrix constructed from the reflectivity series $r_1$, $\Sigma_{wf} = \Sigma_w - \Sigma_w R^T(R\Sigma_w R^T + \Sigma_s)^{-1} R\Sigma_s$;

b) generating a candidate value $\mu_w^{(t)}$ from following full conditional distribution:

$$f(\mu_w|w^{(t)},\sigma_w^{2(t-1)},\sigma_s^{2(t-1)},s,r):N_o(\mu_{\mu_w f},\Sigma_{\mu_w f});$$

where, $\mu_{\mu_w f} = \Sigma_{wa}(\Sigma_{wa} + \Sigma_w)^{-1} w$, $\Sigma_{\mu_w f} = \Sigma_{wa} - \Sigma_{wa}(\Sigma_{wa} + \Sigma_w)^{-1}\Sigma_{wa}$;

c) generating candidate value $\sigma_w^{2(t)}$ from following full conditional distribution:

$$f(\sigma_w^2 | w^{(t)}, \mu_w^{(t)}, \sigma_s^{2(t-1)}, s, r): IGa(\alpha_{wf}, \lambda_{wf});$$

$$\text{where, } \alpha_{wf} = \alpha_w + \frac{o}{2}, \lambda_{wf} = \lambda_w + \frac{(w-\mu_w)^T M_w^{-1}(w-\mu_w)}{2};$$

d) generating a candidate value $\sigma_s^{2(t)}$ from following full conditional distribution:

$$f(\sigma_s^2 | w^{(t)}, \mu_w^{(t)}, \sigma_w^{2(t)}, s, r): IGa(\alpha_{sf}, \lambda_{sf});$$

$$\text{where, } \alpha_{sf} = \alpha_s + \frac{m}{2}, \lambda_{sf} = \lambda_s + \frac{(S_1 - r_1 * w)^T M_s^{-1}(S_1 - r_1 * w)}{2};$$

Obtaining the estimated depth-domain seismic wavelet if the candidate value w meets the convergence condition.

(4) using the calculated reflectivity series r as the initial input data $p(z;0) = [r(0),L,r(n),L,r(D)]^T$;

performing a Fourier transform to the depth-domain wavelet w to obtain the wave number domain wavelet W;

(5) calculating $e^{-ik_z\Delta d}$;

where, $$k_z = \frac{4\pi \times (j-1)}{0.002 \times v(n) \times t},$$

j is the $j_{th}$ frequency sampling point, v(n) is a velocity at $n_{th}$ depth sampling point, t is the number of frequency sampling points, Δd is a depth sampling interval;

multiplying $e^{-ik_z \Delta d}$ with p(n−1;j) to obtain p(n;j); where $$p(n;j)=e^{-ik_z\Delta d} \times p((n-1);j);$$

(6) Returning to step (5) and continuing the depth cycle until a maximum depth is reached; so that the temporary variable p(j) at current frequency j is obtained as follow:

$$p(j)=p(D;j) \times W(j);$$

where D is the number of the depth sampling points;

(7) taking another frequency of j+1, repeating steps (5) and (6) until all frequencies have been repeated, so that the following temporary array is obtained:

$$p'=[p(1); \ldots ;p(j); \ldots ;p(t)];$$

(8) initializing the values of frequency and depth; taking a frequency of j, when the depth is n, calculating $e^{ik_z\Delta d}$ and multiplying $e^{ik_z\Delta d}$ with p(j), so that a temporary variable P(n; j) is obtained:

$$P(n;j)=e^{ik_z\Delta d} \times p(j);$$

(9) taking another frequency j+1, returning to step (8) and continuing the frequency cycle until the maximum frequency is reached; so that the value of synthetic seismogram at depth n is obtained as follow:

$$P(n) = \sum_{j=1}^{j=t} P(n; j);$$

(10) taking another depth n+1, repeating steps (8) and (9) until the maximum depth is reached; a final synthetic seismic record P is obtained:

$$P=[P(1), \ldots ,P(n), \ldots ,P(D)].$$

It should be understood that for those of ordinary skills in the art, improvements or variations can be made based on the above descriptions, and such improvements and variations fall within the scope of the appended claims.

The embodiments are only illustrative of the present disclosure, and apparently the implementations are not limited by the above modes. The embodiments described herein and various modifications based on the ideas and technical solutions of the present disclosure fall within the scope of the present application.

What is claimed is:

1. An integrated method for estimation of depth-domain seismic wavelets and synthesis of seismic records in depth domain, the method comprising:
   a) drilling a borehole to perform well logging such that a well log is obtained;
   b) obtaining depth coordinates and P-wave velocity v and density from the well log, and calculating a corresponding reflectivity series r;
   c) performing constant-velocity depth conversion for a seismic trace S and a reflectivity series r by using a velocity $v_c$ as a reference velocity to obtain the converted seismic trace $S_1$ and the converted reflectivity series $r_1$; and estimating the depth domain seismic wavelet w based on the Gibbs sampling method; and
   d) synthesizing depth-domain seismic records by using the P-wave velocity v and the reflectivity series r obtained in step 1) and the estimated depth-domain seismic wavelet w in step 2).

2. The integrated method of claim 1, wherein estimating the depth-domain seismic wavelet w based on the Gibbs sampling method in the step c) further comprises:
   performing the constant-velocity depth conversion according to following formula:

$$\Delta d_c = \Delta d \times \frac{v_c}{v_{max}};$$

where, Δd is a depth sampling interval of well log, $v_c$ is a user-defined constant velocity, $v_{max}$ is a maximum velocity recorded in well log, and $\Delta d_c$ is a depth sampling interval after the constant-velocity depth conversion;

resampling the seismic trace S and the reflectivity series r at the converted sampling interval $\Delta d_c$ to obtain the converted seismic trace $S_1$ and the converted reflectivity series $r_1$;

wherein a convolution model for estimating the seismic wavelet is as follows:

$$S_1=r_1*w+e;$$

where, $S_1$ and $r_1$ are the seismic trace and the reflectivity series in the constant-velocity depth domain, respectively, "*" represents the convolution operation; w is the seismic wavelet in the constant-velocity depth domain; e is the error term;

where, the error term e meets the multivariate normal distribution with a mean vector of 0 and a covariance matrix of $\Sigma_s$; the seismic trace $S_1$ in the constant-velocity depth domain satisfies a following normal distribution:

$$S_1|\mu_s,\Sigma_s \sim N_m(\mu_s,\Sigma_s);$$

where, N represents a normal distribution, m is the number of sampling points of $S_1$, $\mu_s=r_1*w$, $\Sigma_s=\sigma_s^2 M_s$; where $M_s$ is a correlation coefficient matrix constructed by $S_1$, $\sigma_s^2$ satisfies an inverse-gamma distribution:

$$\sigma_s^2 \sim IGa(\alpha_s,\lambda_s);$$

where, $\alpha_s$ is a shape parameter, $\lambda_s$ is a scale parameter;

wherein the seismic wavelet w estimated in the constant-velocity depth domain satisfies following normal distribution:

$$w|\mu_w,\Sigma_w \sim N_o(\mu_w,\Sigma_w);$$

wherein, N represents the normal distribution and o is the number of sampling points of w, $\mu_w$ meets a multivariate normal distribution with a mean vector of 0 and a covariance matrix of $\Sigma_{wa}=10000M_w$, $\Sigma_w=\sigma_w^2 M_w$; where $M_w$ is a correlation coefficient matrix constructed from a known wavelet; $\sigma_w^2$ also satisfies an inverse-gamma distribution:

$$\sigma_w^2 \sim IGa(\alpha_w,\lambda_w);$$

where, $\alpha_w$ is a shape parameter, $\lambda_w$ is a scale parameter;

unknown parameters involved in the depth-domain seismic wavelet estimation model are: w, $\mu_w$, $\sigma_w^2$ and $\sigma_s^2$;

according to the Bayesian theorem, a posterior distribution of the unknown parameters is expressed as:

$$p(w,\mu_w,\sigma_w^2,\sigma_s^2|s,r) \propto p(s|r,w,\sigma_s^2)p(w|\mu_w,\sigma_w^2)p(\mu_w)p(\sigma_w^2)p(\sigma_s^2);$$

estimating the depth-domain seismic wavelet w based on the Gibbs sampling method further comprises:
   1) giving the initial values of $w^{(0)}$, $\mu_w^{(0)}$, $\sigma_w^{2(0)}$, $\sigma_s^{2(0)}$ to w, $\mu_w$, $\sigma_w^2$, $\sigma_s^2$ respectively;
   2) repeating the following steps at a given number of cycles t=1, 2, . . . :

i) generating a candidate value $w^{(t)}$ from following full conditional distribution:

$$f(w|\mu_w^{(t-1)},\sigma_w^{2(t-1)},\sigma_s^{2(t-1)},s,r):N_o(\mu_{wf},\Sigma_{wf});$$

ii) generating a candidate value $\mu_w^{(t)}$ from following full conditional distribution:

$$f(\mu_w|w^{(t)},\sigma_w^{2(t-1)},\sigma_s^{2(t-1)},s,r):N_o(\mu_{\mu_wf},\Sigma_{\mu_wf});$$

iii) generating a candidate value $\sigma_w^{2(t)}$ from following full conditional distribution:

$$f(\sigma_w^2|w^{(t)},\mu_w^{(t)},\sigma_s^{2(t-1)},s,r):IGa(\alpha_{wf},\lambda_{wf}); \text{ and}$$

iv) generating a candidate value $\sigma_s^{2(t)}$ from following full conditional distribution:

$$f(\sigma_s^2|w^{(t)},\mu_w^{(t)},\sigma_w^{2(t)},s,r):IGa(\alpha_{sf},\lambda_{sf}); \text{ and}$$

obtaining the estimated depth-domain seismic wavelet if the candidate value $w^{(t)}$ meets the convergence condition.

3. The integrated method of claim 1, wherein the step d) further comprises:

1) using the calculated reflectivity series r as the initial input data $p(z;0)=[r(0), \ldots, r(n), \ldots, r(D)]^T$; performing the Fourier transform to the depth-domain wavelet w to obtain the wave number domain wavelet W;

2) calculating $e^{-ik_z\Delta d}$;

where, $$k_z = \frac{4\pi \times (j-1)}{0.002 \times v(n) \times t},$$

j is the $j_{th}$ frequency sampling point, v(n) is a velocity at the $n_{th}$ depth sampling point, t is the number of frequency sampling points, $\Delta d$ is a depth sampling interval;

multiplying $e^{-ik_z\Delta d}$ with p(n−1;j) to obtain p(n;j):

$$p(n;j)=e^{-ik_z\Delta d}\times p((n-1);j);$$

3) returning to step 2) and continuing the depth cycle until a maximum depth is reached, so that the temporary variable p(j) at current frequency j is obtained as follows:

$$p(j)=p(D;j)\times W(j);$$

where D is the number of the depth sampling points;

4) taking another frequency j+1, and repeating steps 2) and 3) until all frequencies have been repeated, so that following temporary array is obtained:

$$p'=[p(1), \ldots, p(j), \ldots, p(t)];$$

5) initializing the values of frequency and depth; taking a frequency of j, when the depth is n, calculating $e^{ik_z\Delta d}$ and multiplying $e^{ik_z\Delta d}$ with p(j), so that a temporary variable P(n;j) is obtained:

$$P(n;j)=e^{ik_z\Delta d}\times p(j);$$

6) taking another frequency j+1, returning to step 5) and continuing the frequency cycle until the maximum frequency is reached; so that the value of synthetic seismogram at depth n is obtained as follows:

$$P(n) = \sum_{j=1}^{j=t} P(n; j);$$

and 7) taking another depth n+1, repeating steps 5) and 6) until a maximum depth is reached; a final synthetic seismogram P is obtained:

$$P=[P(1), \ldots, P(n), \ldots, P(D)].$$

* * * * *